(12) United States Patent
Amra et al.

(10) Patent No.: US 7,747,760 B2
(45) Date of Patent: Jun. 29, 2010

(54) NEAR REAL-TIME DATA CENTER SWITCHING FOR CLIENT REQUESTS

(75) Inventors: Nadir Khalid Amra, Rochester, MN (US); Kevin Glynn Paterson, Rochester, MN (US); Steven John Simonson, Rochester, MN (US); Arthur Douglas Smet, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1713 days.

(21) Appl. No.: 10/901,843

(22) Filed: Jul. 29, 2004

(65) Prior Publication Data

US 2006/0036761 A1     Feb. 16, 2006

(51) Int. Cl.
*G06F 15/16* (2006.01)
*G06F 15/00* (2006.01)

(52) U.S. Cl. ......................................... 709/228; 706/62

(58) Field of Classification Search ......... 709/227–229, 709/203
See application file for complete search history.

(56) References Cited

U.S. PATENT DOCUMENTS

| | | | | |
|---|---|---|---|---|
| 6,226,684 | B1 * | 5/2001 | Sung et al. ................... | 709/238 |
| 6,598,071 | B1 * | 7/2003 | Hayashi et al. .............. | 709/203 |
| 6,889,229 | B1 * | 5/2005 | Wong et al. .................. | 707/102 |
| 6,892,222 | B2 * | 5/2005 | McDowell et al. ........... | 709/206 |
| 7,340,490 | B2 * | 3/2008 | Teloh et al. .................. | 707/204 |
| 7,383,463 | B2 * | 6/2008 | Hayden et al. ................ | 714/4 |

OTHER PUBLICATIONS

Hinton, et al., U.S. Appl. No. 09/710,926, "Method and System for Web-Based Cross-Domain Single-Sign-On Authentication", filed Nov. 9, 2000.

Daude, et al, U.S. Appl. No. 09/717,704, "Method and System for Monitoring Domain Name System (DNS) Service in an Internet Protocol (IP) Network", filed Nov. 25, 1999.

http://www.akamai.com/en/html/business/ebusiness_continuity. html, "Akamai e-Business Continuity", pp. 1-2, date unknown, printed Jul. 27, 2004.

* cited by examiner

*Primary Examiner*—Donald Sparks
*Assistant Examiner*—Li-Wu Chang
(74) *Attorney, Agent, or Firm*—Martin & Associates, LLC; Grant A. Johnson

(57) ABSTRACT

A networked computer system provides a way to quickly switch to a backup data center when a primary data center fails. Each data center includes a redirect table that specifies a geographical area corresponding to each user. The redirect table is replicated on one or more data centers so that each data center has the same information. When a data center fails, the redirect table in one of the non-failed data centers is updated to specify a new data center for each client that used the failed data center as its primary data center. A network dispatcher recognizes that the failed data center is unavailable, and routes a request to the backup data center. Network routing logic then issues a redirection command that causes all subsequent requests from that client to be redirected directly to the backup data center.

6 Claims, 6 Drawing Sheets

NEAR REAL-TIME DATA CENTER SWITCHING FOR CLIENT REQUESTS

BACKGROUND OF THE INVENTION

1. Technical Field

This invention generally relates to computer systems, and more specifically relates to the servicing of client requests by data centers.

2. Background Art

The widespread proliferation of computers in our modern society has prompted the development of computer networks that allow computers to communicate with each other. With the introduction of the personal computer (PC), computing became accessible to large numbers of people. Networks for personal computers were developed that allow individual users to communicate with each other. In this manner, a large number of people within a company could communicate with other computers on the network.

One significant computer network that has recently become very popular is the Internet. The Internet grew out of this proliferation of computers and networks, and has evolved into a sophisticated worldwide network of computer system resources commonly known as the "world-wide-web", or WWW. A user at an individual PC (i.e., workstation) that wishes to access the Internet typically does so using a software application known as a web browser. A web browser makes a connection via the Internet to other computers known as web servers, and receives information from the web servers that is displayed on the user's workstation.

The volume of business conducted via the Internet continues to grow at an exponential rate. Many on-line merchants do such a large volume of business that reliability of their computer systems is critical. Many such systems include data replication between different data centers. A data center includes one or more server computer systems that are responsible for servicing requests from clients. Data replication between different service centers allows a different server to take over in the event that the primary server fails.

Referring to FIG. 1, a prior art computer system 100 includes a geographical region Geo1 112 that is assigned to a particular client 110. Client 110 typically corresponds to a human user, but could be any suitable client. Client 110 has the ability to query the Dallas data center 130 or the Denver data center 140. In this particular example, the Dallas data center 130 is the primary data center for geographical region Geo1 112 that was assigned to the client 110, and the Denver data center 140 is the backup data center for Geo1 112. When the client 110 needs to access the data center corresponding to Geo1, it sends a domain name request to the Domain Name Server (DNS) 120 specifying the domain name, which returns the Internet Protocol (IP) address that corresponds to the domain name. In this specific example, the domain name is geo1.business.com. In response to the domain name request, the DNS returns the IP address of the Dallas data center 130. The client 110 now communicates directly with the Dallas data center 130. Note that the Dallas data center 130 and the Denver data center 140 are bi-directionally replicated, meaning that a change to either is propagated to the other, to keep the two data centers in sync with each other.

Now we consider what happens when a data center fails, meaning that the data in the data center is unavailable for some reason. Referring to FIG. 2, a prior art method 200 begins when the Dallas data center fails (step 210). In response to the failure, the system administrator of the Dallas data center 130 updates the IP address for the geo1.business.com domain name entry in the DNS 120 to point to the IP address for the Denver data center 140, which is the backup (step 220). In theory, and in looking at method 200 in FIG. 2, such an approach is very easy to implement. However, this prior art approach in method 200 suffers from severe shortcomings. For one thing, a DNS entry is often cached on a client. Thus, a change to a DNS entry will not be updated on the client until the client decides to refresh its cache. It is not uncommon to have a DNS cache entry refresh time specified in hours. Furthermore, DNS 120 is typically coupled to many other DNS servers, so it takes time for a change in one DNS to be propagated to a different DNS, and then to all the clients that DNS serves. As a result, even if the system administrator catches a failure in the Dallas data center 130 and immediately changes the DNS entry for the corresponding domain name, it can often take hours for this change to propagate through all DNS servers and into all clients that have cached DNS entries. While the DNS entries are being updated, many client requests may fail because the Dallas data center 130 has failed, and the address for the corresponding domain name geo1.business.com has not been fully propagated to all DNS servers. For a business like Amazon.com that relies so heavily upon its computer systems, the unavailability of a data center can cost the company tens of thousands of dollars per minute, which easily translates to millions of dollars in lost sales annually due to failed computer systems. Without a way to easily and quickly switch from one data center to another, computer systems will continue to cost businesses that rely upon these computer systems millions in lost revenue due to the unavailability of a failed data center.

DISCLOSURE OF INVENTION

A networked computer system provides a way to quickly switch to a backup data center when a primary data center fails. Each data center includes a redirect table that specifies a geographical area corresponding to each user. The redirect table is replicated on one or more data centers so that each data center has the same information. When a data center fails, the redirect table in one of the non-failed data centers is updated to specify a new data center for each client that used the failed data center as its primary data center. A network dispatcher recognizes that the failed data center is unavailable, and routes a request to the backup data center. Network routing logic then issues a redirection command that causes all subsequent requests from that client to be redirected directly to the backup data center.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention provides a way to perform a switch to a new data center within seconds. The prior art method of redirection by updating DNS entries can take hours to ripple through the DNS system. The delay in updating DNS entries causes substantial revenue loss when a data center fails. The present invention, by switching to a new data center within seconds instead of hours, provides a solution that saves substantial revenue in the form of sales that may be processed by redirecting client requests to a new data center without waiting for DNS entries to be updated.

Figure 3:
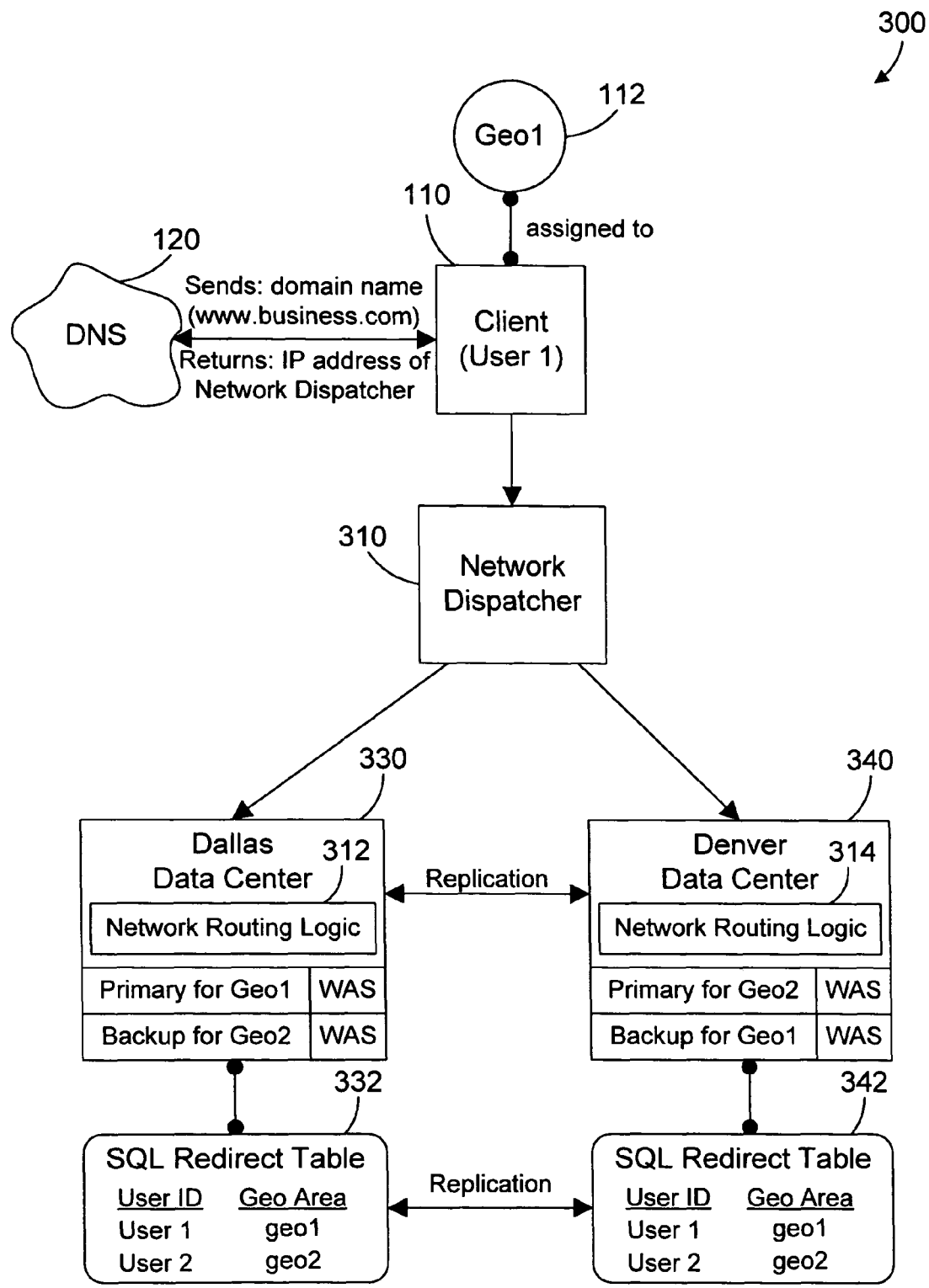
FIG. 3 is a block diagram of a networked computer system in accordance with the preferred embodiments.

Referring to FIG. 3, a networked computer system 300 in accordance with the preferred embodiments includes a client computer system 110 coupled to a network dispatcher 310, which is, in turn, coupled to two data centers 330 and 340. The term "data center" is a term that is well-known in the art, and is representative of a server computer system that includes data that clients may need to access. In the specific configuration in FIG. 3, one network dispatcher and two data centers are shown. Note, however, that the preferred embodiments expressly extend to any suitable number of network dispatchers and data centers.

In the specific configuration in FIG. 3, the Dallas data center 330 is bi-directionally replicated with the Denver data center 340. We assume that an IBM WebSphere Application Server (WAS) runs on each data center, and is responsible for handling requests to two different geographical regions, designated Geo1 and Geo2 in FIG. 3. Note, however, that any suitable application server could be used. The Dallas data center 330 is a primary data center for geographical region Geo1, and is a backup data center for geographical region Geo2. Similarly, the Denver data center 340 is a primary data center for geographical region Geo2, and is a backup data center for geographical region Geo1. The data in each data center 330, 340 is bi-directionally replicated to the other data center, thereby allowing either one to take over in the event of failure of the other. This redundant data allows for easily recovering from a failure in one data center by switching to a different data center, which contains the same data.

We assume for the example in FIG. 3 that the client 110 has been assigned to geographical region Geo1 112. We also assume the client 110 is coupled to one or more domain name servers (DNS) 120, which receives a domain name from the client 110 and responds with a corresponding IP address, as is known in the art.

Each data center includes a corresponding redirect table. Thus, Dallas data center 330 has an SQL redirect table 332, and Denver data center 340 has a corresponding SQL redirect table 342. These two redirect tables use bi-directional replication which enables an SQL table to be collocated across server nodes on a network. Thus, a change to the table in one data center is replicated to all copies of the table on all other data centers that have a replicated SQL redirect table. The redirect tables 332 and 342 contain information that allows correlating a client (or user) to a corresponding geographical area. Note that the information within each data center also correlates each geographical area to a corresponding server, namely WebSphere Application Server (WAS). Thus, we know that the Dallas data center 330 is the primary data center for Geo1, and hence, for User 1, as shown in redirect table 332. In like manner, we also know that the Dallas data center 330 is the backup data center for Geo2, and hence, for User 2, as shown in redirect table 332.

Each data center includes corresponding network routing logic in accordance with the preferred embodiments. Thus, Dallas data center 330 includes network routing logic 312, and Denver data center 340 includes network routing logic 314. The network routing logic allows using the redirect tables and HTTP redirection to easily and quickly redirect client requests to a backup data center when the primary data center fails, without waiting for a changed DNS entry to propagate through the DNS system. We note that in FIG. 3, the bi-directional replication between data centers 330 and 340 is active, and the bi-directional replication between redirect tables 332 and 342 is also active. This is the case when both data centers are operating correctly. When a client desires to access a web site, designated in FIG. 3 as www-.business.com, the client 110 sends the domain name www-.business.com to domain name server 120, which returns the IP address of the network dispatcher 310. By returning the IP address of the network dispatcher 310, we are allowing the network dispatcher 310 to perform the routing of the request to any available data center. The network dispatcher 310 enables the data centers 330 and 340 to be dynamically linked into a single entity that appears from the client's perspective to be a single logical server. When the network dispatcher 310 receives the client request to www.business.com, the network dispatcher 310 routes the request to either of the Dallas or Denver data centers, depending on load balancing criteria that are well-known in the art for network dispatchers.

Figure 1:
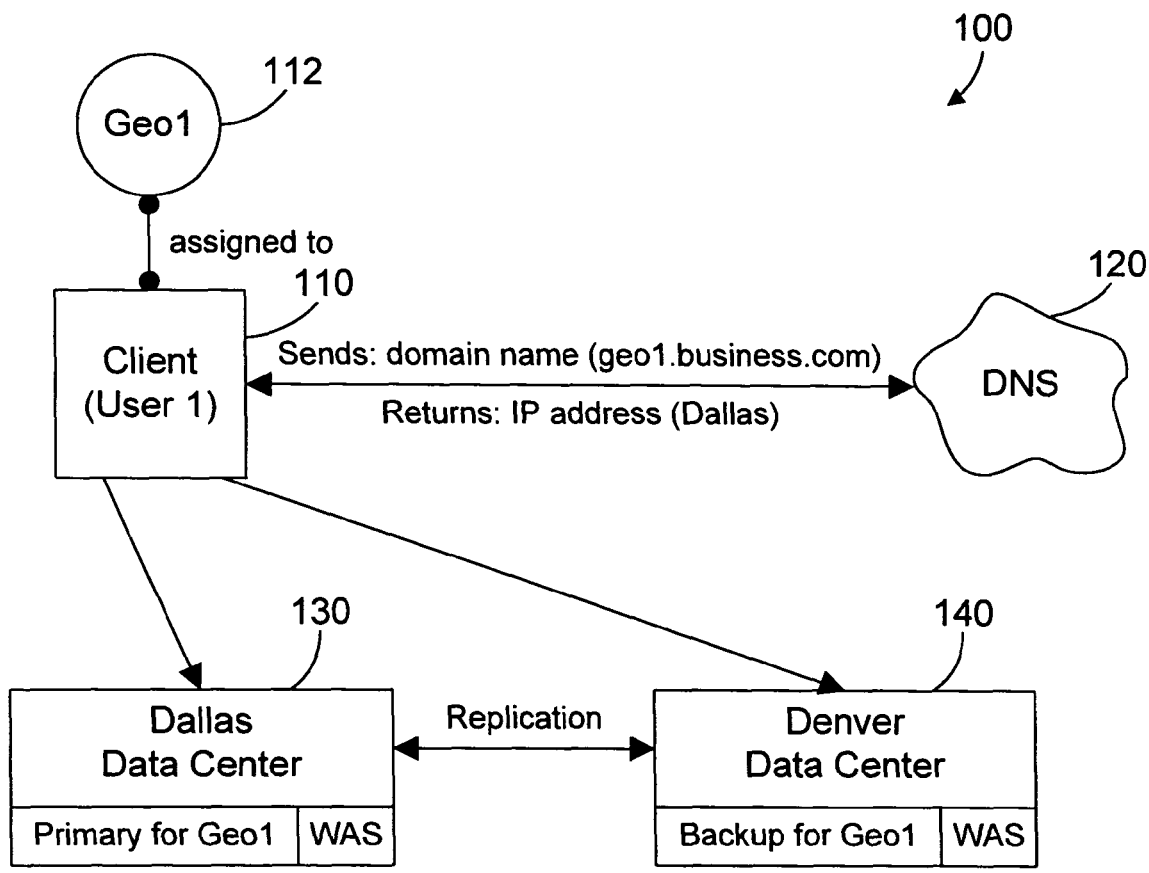
FIG. 1 is a block diagram of a prior art networked computer system.
Figure 2:
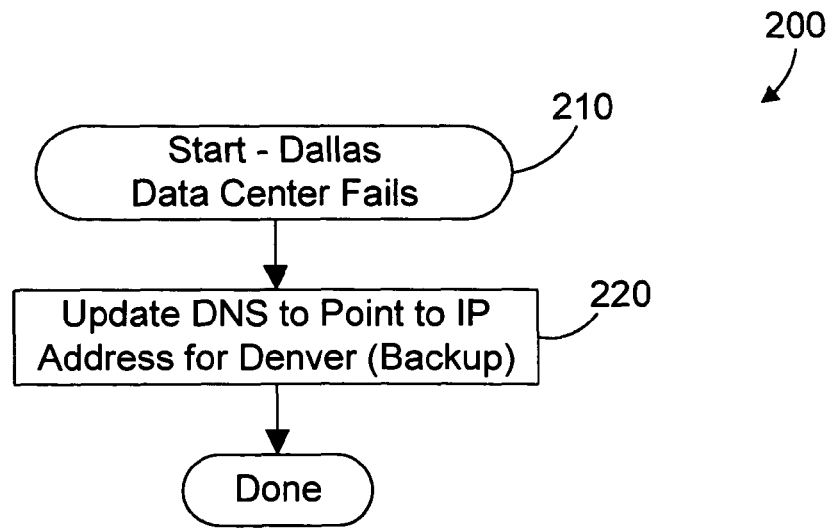
FIG. 2 is a flow diagram of a prior art method for switching client requests to a new data center when a data center fails.
Figure 4:
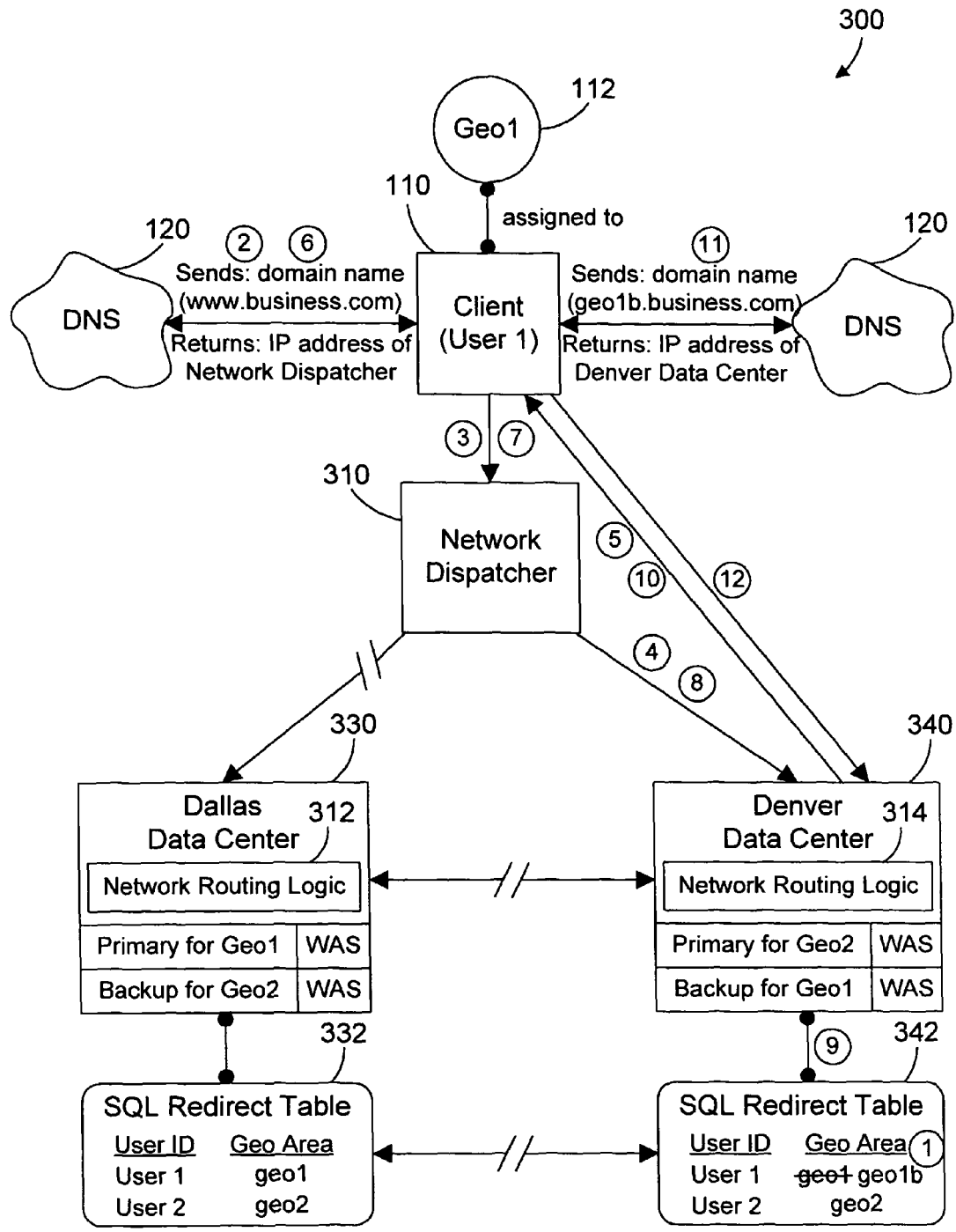
FIG. 4 is a block diagram of the networked computer system in FIG. 4 after the Dallas data center 330 fails.

Now we consider what happens when a data center fails. Referring to FIG. 4, we assume that the Dallas data center 330 fails, and is therefore unavailable. This failure is represented in FIG. 4 by the broken lines between the dispatcher 310 and the Dallas data center 330, between the Dallas data center 330 and the Denver data center 340 and between the redirect tables 332 and 342. Once the client 110 has successfully signed on, the network routing logic 314 within the Denver data center 340 issues a redirect command that causes all subsequent requests from client 110 to be directly routed to the Denver data center 340, because the Dallas data center 330 is unavailable. This switching from the Dallas data center 300 to the Denver data center 340 occurs very quickly, typically on the order of seconds. The DNS update mechanism of the prior art illustrated in FIGS. 1 and 2, and discussed in detail in the Background of the Invention, can take hours to propagate completely through the DNS system. As a result, the preferred embodiments allow quickly and easily switching to a backup data center when a data center fails, thereby minimizing down time in servicing client requests for the failed data center.

Once a failure of the Dallas data center 330 is detected, the redirect table 342 in the Denver data center 340 is updated to specify a new geographical region for User 1, namely geo1b. We assume that geo1b represents a separate DNS entry in the domain name server 120. For this specific example, we assume that the entry for geo 1b in DNS 120 specifies the IP address for the Denver data center 340. The update of the redirect table 342 could be done manually by a system administrator after being informed of the failure of Dallas data center 330, or could be performed automatically by some software agent in response to a detected failure in Dallas data center 330. The update of the redirect table 342 is represented as step 1 in FIG. 4.

We now assume that client 110 then makes a request to the DNS 120 for the IP address corresponding to www.business-.com. In response, the DNS 120 returns the IP address for the network dispatcher 310 (step 2). The request is then submitted to the network dispatcher (step 3). The network dispatcher recognizes that the Dallas data center 330 is no longer available, and therefore routes the request to the Denver data center 340 (step 4). If there were other data centers with data replication to the Dallas and Denver data centers, the network dispatcher could route the request to any available data center. Because the Denver data center 340 is the only available data center in FIG. 4, the WebSphere Application Server (WAS) in the Denver data center 340 prompts the user to sign-on (step 5). The user submits the sign-on request, which is routed to the network dispatcher 310 and to the Denver data center 340 (steps 6, 7 and 8). At this point the WAS in the Denver data center 340 handles the sign-on request. The network routing logic 314 then queries the SQL redirect table 342 to determine the geographical area assigned to User 1 110 (step 9). We see from the contents of the redirect table 342 that the geographical area for User 1 was changed from geo1 to geo1b in step 1. At this point the Denver data center 340 sends an HTTP redirect command to the client 110 (step 10). For the specific example in FIG. 4, such a command could have the format geo1b.business.com/BUS-APP/wss?user-id=user 1. The client 110 then queries the DNS 120 for the IP address corresponding to the redirected address, geo1b.business.com. The DNS includes an entry for geo1b.business.com that specifies the IP address of the Denver data center 340 (step 11). This HTTP redirect command has the effect of causing client 110 to direct all requests for the remainder of the session from the client 110 directly to the Denver data center 340 (step 12). In this manner, the network routing logic 314 uses the information in the redirect table 342 and uses HTTP redirection to dynamically reroute client requests to the Denver data center when the Dallas data center fails. The switching takes only seconds to complete instead of hours, which means that the switch occurs in near real-time.

Figure 5:
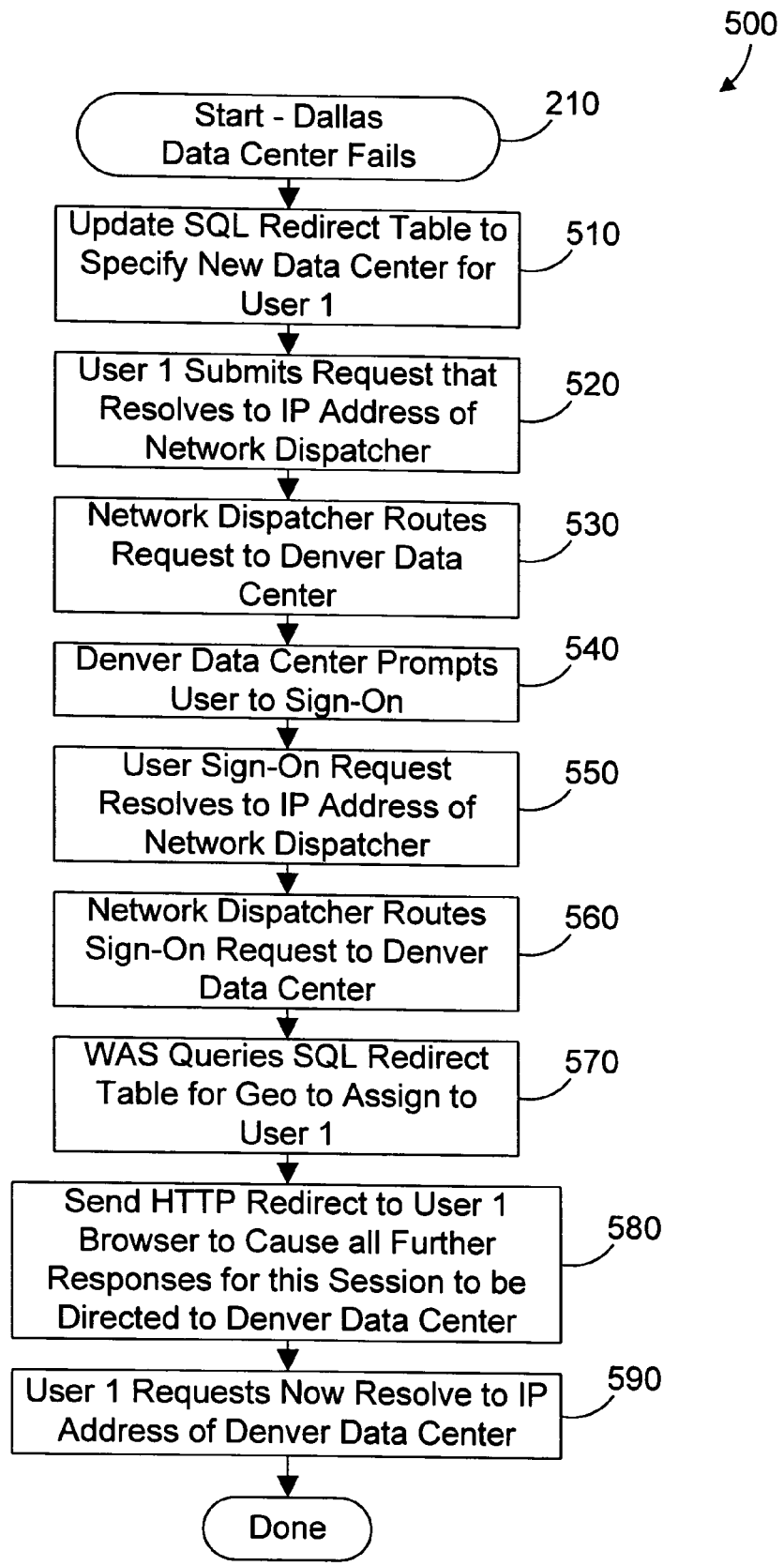
FIG. 5 is a flow diagram of a method in accordance with the preferred embodiments for quickly redirecting client requests to a backup data center when a primary data center fails.

The steps 1-12 in FIG. 4 may be alternatively represented by method 500 in FIG. 5, which is one specific example for the sample system in FIG. 4 in accordance with the preferred embodiments. Method 500 begins when the Dallas data center 330 fails (step 210). The redirect table 342 in the Denver data center 340 is updated to show a new geographical area geo1b for User 1 because the Dallas data center 330 failed (step 510). Note that the entry geo1b in redirect table 342 is a geographical designator that corresponds to the Denver data center 340. Again, the update of the redirect table 342 could be performed by a system administrator or could be performed by some software agent. The client (User 1) 110 then submits a request that resolves to the IP address of the network dispatcher 310 (step 520). The network dispatcher 310 routes the request to an available data center, which for this specific example is the Denver data center 340 (step 530). The Denver data center 340 then prompts the user to sign-on (step 540). The user sign-on request resolves to the IP address of the network dispatcher (step 550), which routes the sign-on request to the Denver data center 340 (step 560). The network routing logic 314 then queries the redirect table 342 to determine which geographical region is assigned to User 1 110 (step 570). The network routing logic 314 uses the information from the redirect table 342 to format an appropriate HTTP redirect command to User 1 110 (step 580). This redirect command causes the browser to send all requests for the rest of the session directly to the Denver data center 340. Each subsequent request from User 1 110 is then resolved to the IP address of the Denver data center 340 (step 590), allowing all subsequent requests during the client session to be handled directly by the Denver data center 340 without passing through the network dispatcher 310.

While network routing logic 312 and 314 in FIGS. 3 and 4 are shown to reside within the data centers 330 and 340, respectively, one skilled in the art will realize this is shown as a matter of convenience. The network routing logic could be a computer program separate from the data centers, or its functions could be distributed among different system components within the scope of the preferred embodiments.

Method 500 is presented as one suitable method in accordance with the preferred embodiments that may be used for the specific example in FIG. 4 when the Dallas data center 330 goes down. One skilled in the art will recognize based on the examples in FIGS. 3-5 that the computer systems in accordance with the preferred embodiments may have many different configurations. For example, there could be three different data centers A, B and C that are all replicated to each other, with two other data centers D and E that are replicated to each other. In addition, multiple network dispatchers could be present, with a first network dispatcher serving as a backup to a second network dispatcher in the event of failure by the second network dispatcher. In this case, the first network dispatcher could take over and handle requests coming into the same IP address as the second network dispatcher. The preferred embodiments expressly include any and all configurations and methods that allow quickly rerouting client requests to a different data center when needed without updating DNS entries. In the specific example shown in FIGS. 4 and 5, the event that causes the need for rerouting is a failure in the Dallas data center 330. Note, however, that the networked computer system 300 and corresponding method 500 could be employed to reroute client requests to a different data center for reasons other than failure. For example, let's assume that a new data center is being brought on-line to replace an old data center, where the new data center includes updated software that gives the new data center enhanced functionality. The new data center could be initialized, and once its data (including redirect table) has been replicated with one or more other existing data centers, the requests to the old data center could then be directed to the new and improved data center using the principles of the preferred embodiments. Once the old data center is no longer servicing requests, it could then be taken down for software updates or other maintenance, or could be disposed of.

In the specific example shown in FIGS. 3-5, it was stated that the redirect table 342 in FIG. 4 could be changed in step 1 by either a system administrator (human) or by a software agent. A specific example is now presented in FIGS. 6 and 7 that includes a software agent that may automatically effect the change to the redirect table. In computer system 600 in FIG. 6, the network dispatcher 310 includes a smart agent 614. The job of the smart agent 614 is to monitor the health of all data centers that the network dispatcher 310 manages. If one of the data centers has a problem, the smart agent 614 may automatically make a change to a redirect table that will cause the rerouting of client requests to occur without human intervention. To accomplish this, the smart agent 614 needs access to a file referred to in FIG. 6 as a geo backup file 620. This file correlates geographical regions to data centers. Thus, the geo backup file 620 shows that Dallas is the primary data center for geo1, and the backup data center for geo2. Similarly, the geo backup file 620 also shows that Denver is the primary data center for geo2, and the backup for geo1. Note that geo backup file 620 is shown in FIG. 6 to reside within network dispatcher 310, but the geo backup file 620 could be in any location so long as it is accessible by the smart agent 614.

Figure 6:
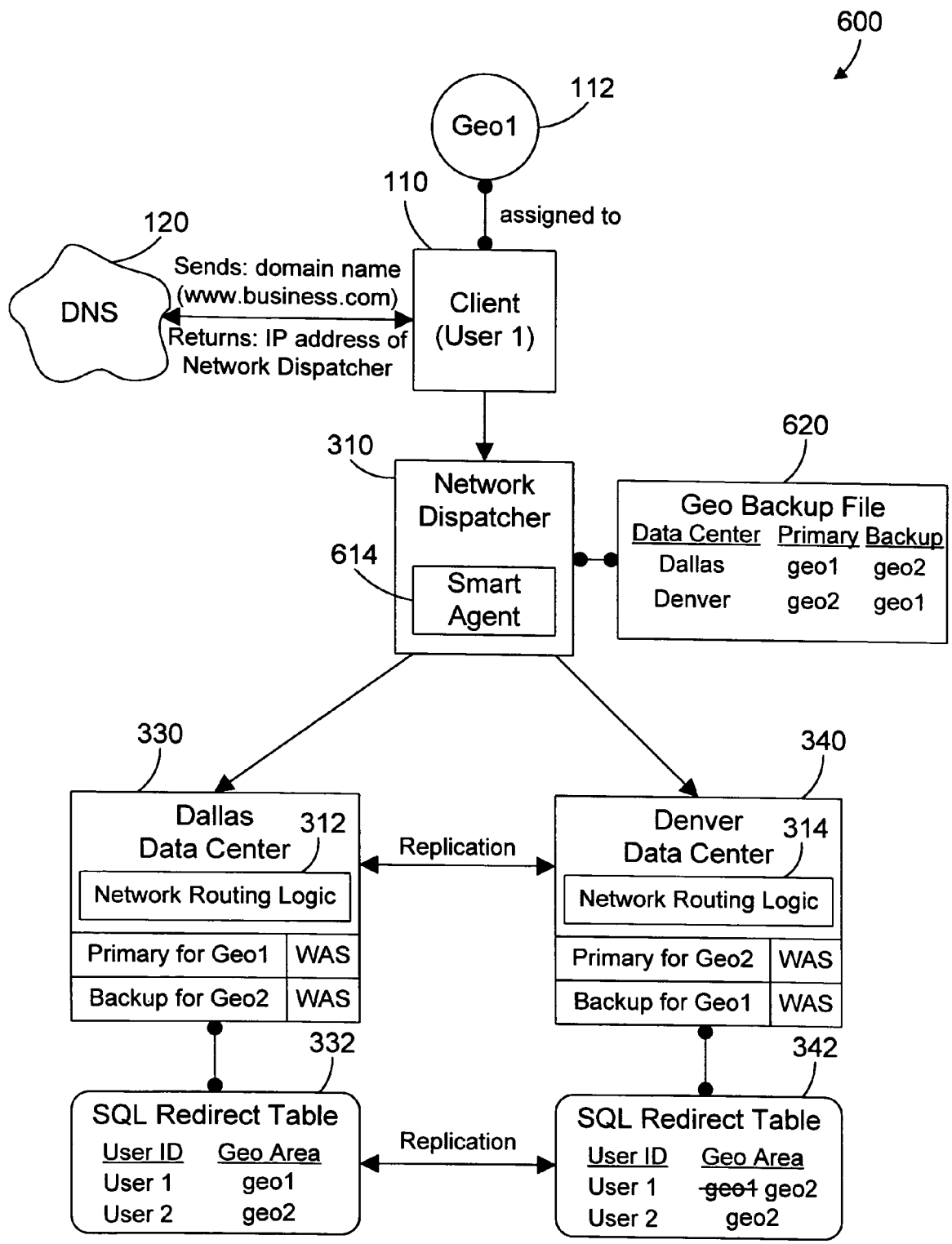
FIG. 6 is a block diagram of a networked computer system in accordance with the preferred embodiments that includes a smart agent that actively monitors the health of data centers and initiates rerouting of client requests to a different data center.
Figure 7:
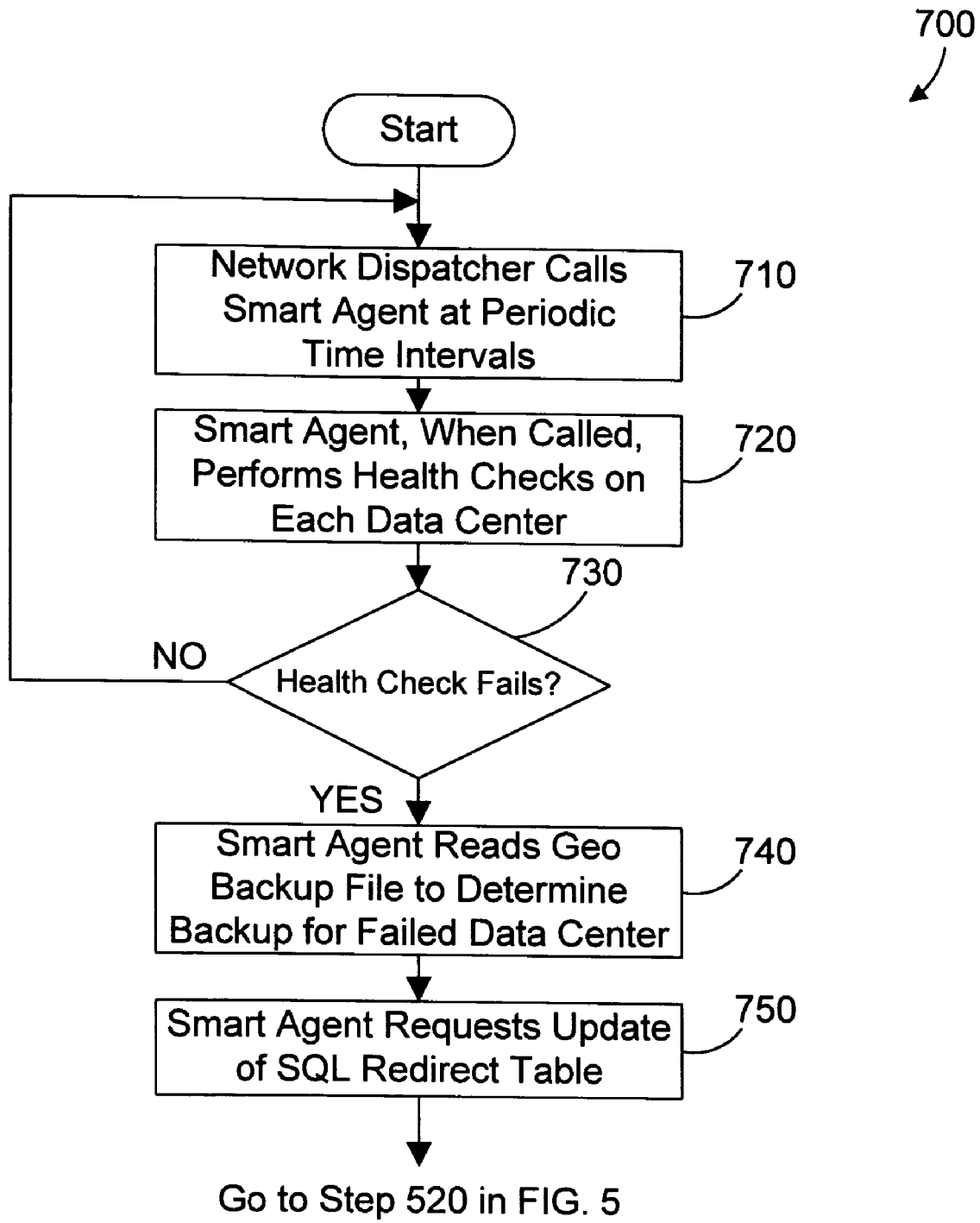
FIG. 7 is a flow diagram of a method in accordance with the preferred embodiments for checking the health of the data centers in FIG. 6 and automatically initiating rerouting of client requests very quickly.

Referring to FIG. 7, a method 700 in accordance with the preferred embodiments begins by the network dispatcher 310 calling the smart agent 614 at periodic time intervals (step 710). For example, the network dispatcher 310 could call the smart agent 614 once every minute to check the health of the data centers 330 and 340. The smart agent, when called, performs the health checks on the data centers (step 720). If the health check passes (step 730=NO), method 700 loops back to step 710 and continues. If a health check for a data center fails (step 730=YES), the smart agent 614 reads the geo backup file 620 to determine the backup for the failed data center (step 740). Using the same example as in FIG. 4, when the Dallas data center 330 fails, the smart agent 614 will detect the failure during a health check of the Dallas data center 330 (in step 720 of FIG. 7). With the failed health check of the Dallas data center 330 (step 730=YES), the smart agent reads the geo backup file 620 and determines that geo2 is the backup for the Dallas data center 330. As a result, the smart agent 614 causes the redirect table 342 of the Denver data center 340 to be updated to replace geo1 with geo2 for User 1 (step 750), as shown in FIG. 6. At this point, execution can resume at step 520 in FIG. 5. The actual rerouting of requests from client 110 occurs in the same manner as before, discussed above with respect to FIGS. 4 and 5. The addition of the smart agent 614 simply provides an automated way to check the health of data centers, and automatically (without human intervention) effect the change to the redirect table that causes the requests from client 110 for the Dallas data center 330 to be rerouted to the Denver data center 340 instead.

Note that smart agent 614 is shown in FIG. 6 to reside within the network dispatcher 310. However, this is shown in this manner as a matter of convenience. The function of smart agent 614 (as represented in method 700 in FIG. 7 for the specific configuration in FIG. 6) could be located in any suitable location. In addition, different functions of smart agent 614 distributed in any suitable way. For example, the smart agent 614 could communicate with a servlet in the Denver data center 340 to direct the update of the redirect table 342, rather than performing the update itself. The preferred embodiments expressly extend to any location or distribution of the functions of the smart agent 614 and/or the network routing logic 312 and 314.

At this point, it is important to note that while the present invention has been and will continue to be described in the context of a fully functional networked computer system, those skilled in the art will appreciate that the network routing logic of the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW, and transmission type media such as digital and analog communications links.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

The preferred embodiments provide a significant advance in the art by allowing near real-time switching of client requests to a new data center in a matter of seconds instead of the hours that result from updating DNS entries. The result is the ability to quickly and efficiently switch from one data center to another with minimal delay and minimal disruption of the servicing of client requests. These features and advantages may be particularly desirable for ebusiness continuity service providers and the like.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A method for routing data requests to a first server computer system from a client computer system to a second server computer system, the method comprising the steps of:
   (A) bi-directionally replicating data corresponding to the data requests between the first server computer system and the second server computer system;
   (B) providing a redirect table in each of the first and second server computer systems that specifies a plurality of users, corresponding geographical assignments, and information that allows determining corresponding server assignments for each of the geographical assignments, wherein data including the redirect table in the first server computer system is bi-directionally replicated with the second server computer system;
   (C) detecting when a failure occurs in the first server computer system;
   (D) in response to detecting when a failure occurs in step (C), updating the redirect table in the second computer system to specify a new geographical assignment for a user of the client computer system;
   (E) the second computer system receiving a first data request from the user of the client computer system, wherein step (E) comprises the steps of:
      the user submitting a data request that resolves to a network dispatcher;
      the network dispatcher routing the data request to the second server computer system;
      the second server computer system prompting the user to log on;
      the user logging on via a sign-on request that resolves to the network dispatcher; and
      the network dispatcher routing the sign-on request to the second server computer system;
   (F) determining from the new geographical assignment for the user in the redirect table in the second computer system the second server computer system is assigned to handle the first data request; and
   (G) in response to the first data request from the client computer system, issuing a redirect command to the client computer system to cause subsequent data requests by the client computer system to the first server computer system to be automatically directed to the second server computer system to provide replicated data in response to the subsequent data requests.

2. The method of claim 1 further comprising the step of determining from the redirect table in the second server computer system information that is used in generating the redirect command.

3. The method of claim 1 further comprising the steps of:
monitoring health of the first and second server computer systems; and
updating the redirect table in one of the first and second server computer systems to replace at least one server assignment to a failed server computer system with at least one corresponding server assignment to a server computer system that has not failed.

4. A method for configuring a networked system to perform a method for routing data requests from a client computer, comprising:
(a) configuring bi-directional replication of data corresponding to the data requests between a first server computer and a second server computer;
(b) configuring a first server computer and a second server computer to each provide a redirect table that specifies a plurality of users, corresponding geographical assignments, and information that allows determining corresponding server assignments for each of the geographical assignments, the redirect table in the first server computer system being bi-directionally replicated with the redirect table in the second server computer;
(c) configuring a network dispatcher to detect when a failure occurs in the first server computer and to route requests for the first server computer by the client computer to the second server computer;
(d) in response to detecting when a failure occurs in step (c), updating the redirect table in the second computer system to specify a new geographical assignment for a user of the client computer;
(e) the second computer system receiving a first data request from the user of the client computer, wherein step (e) comprises the steps of:
the user submitting a data request that resolves to a network dispatcher;
the network dispatcher routing the data request to the second server computer system;
the second server computer system prompting the user to log on;
the user logging on via a sign-on request that resolves to the network dispatcher; and
the network dispatcher routing the sign-on request to the second server computer system;
(f) determining from the new geographical assignment for the user in the redirect table in the second computer system the second server computer system is assigned to handle the first data request; and
(g) configuring network routing logic to issue a redirect commend to the client computer to cause subsequent data requests by the client computer to the first server computer to be automatically directed to the second server computer to provide replicated data in response to the subsequent data requests.

5. The method of claim 1 wherein the redirect command is a hypertext transfer protocol (HTTP) redirect command.

6. The method of claim 4 wherein the redirect command is a hypertext transfer protocol (HTTP) redirect command.

* * * * *